UNITED STATES PATENT OFFICE.

HENRY H. BEACH, OF ROME, NEW YORK.

IMPROVEMENT IN PROCESSES OF SEASONING LUMBER.

Specification forming part of Letters Patent No. 107,854, dated October 4, 1870.

I, HENRY H. BEACH, of the city of Rome, in the county of Oneida and State of New York, have invented an Improved Process of Seasoning Lumber, of which the following is a specification:

The nature of my invention consists in subjecting lumber to the direct action of a confined body of steam of a comparatively high pressure and temperature, it having been discovered by me that when so treated the heat and moisture of the steam will quickly penetrate into the pores and fiber of the wood, and expel the sap therefrom, and that upon subsequent exposure to the atmosphere such moisture will soon evaporate, leaving the pores free from both sap and moisture, and the wood in a thoroughly-seasoned condition, which will be affected by atmospheric changes in only a very slight degree, and greatly less than lumber seasoned by any other method of which I have knowledge.

An apparatus suitable for carrying out my improved process consists of a tank or vessel for receiving the lumber to be treated and a steam-boiler for supplying the requisite steam. The tank may be of cylindrical or other form, and should be of sufficient strength to resist the steam-pressure to which its contents are to be subjected. One end should be provided with a hinged door, closing steam-tight, and provided with suitable means for holding it closed against the outward pressure of the steam.

A truck, upon which the charge of lumber may be piled, and a rail-track, by which said truck may be readily run out from or into the tank, should also be provided for convenient handling of the lumber.

The pipe connecting the steam-boiler with the tank should be provided with a throttle-valve or cock, by which the communication can be opened or closed at pleasure, and a blow-off pipe and valve should be arranged for the discharge of the steam from the tank after a charge of lumber has been subjected to its action for the required length of time. A small stop-cock should also be inserted in the bottom of the tank, for the discharge of the condensed steam and sap.

The operation of charging the tank with lumber is simple and obvious. When the charge of lumber is properly introduced into the tank and the tank closed, the steam is admitted thereto until it is filled with steam and a considerable pressure obtained. The lumber is allowed to remain in the body of steam long enough to produce the effect before described, and is then withdrawn by an obvious operation.

I am unable to give the full range of pressure, temperature, and time which will produce the desired result; but I have demonstrated by trial and experiment that a pressure of fifty pounds per square inch, continued for from five to fifteen minutes, will produce the desired effect upon pine or other boards not more than one inch thick, and that, the pressure remaining the same, the time required will be increased or diminished in proportion to any increase or diminution in the thickness of the boards operated upon, and, further, that a greater pressure will shorten, and a less pressure increase the length of time required.

Lumber treated in this manner will resist atmospheric changes or the action of heat or moisture in a remarkable manner, and will neither shrink nor swell except in an almost inappreciable degree, and much less than lumber treated in the ordinary manner.

I am aware that lumber has been subjected to the action of steam as one step of a process for seasoning the same; but I am not aware that the operation has ever been conducted so as to produce the above-described result. I therefore do not claim, broadly, as my invention the application of the direct action of steam for the seasoning of lumber; but What I do claim as my invention is—

The process which consists in subjecting of lumber to the action of steam under a pressure, and for a time sufficient to produce the results, substantially as hereinbefore set forth.

H. H. BEACH.

Witnesses:
W. H. FORBUSH,
A. J. CLARKE.